United States Patent [19]

Prince

[11] Patent Number: 5,747,127
[45] Date of Patent: May 5, 1998

[54] POLYESTER COMPOSITION FOR USE IN THERMOFORMING DUAL-OVENABLE TRAYS

[75] Inventor: Jack Edward Prince, North Canton, Ohio

[73] Assignee: Shell Oil Company, Houston, Tex.

[21] Appl. No.: 582,039

[22] Filed: Jan. 2, 1996

Related U.S. Application Data

[63] Continuation of Ser. No. 350,292, Dec. 6, 1994, abandoned.
[51] Int. Cl.⁶ .............................. B29D 22/00; C08L 67/02
[52] U.S. Cl. ...................... 428/35.7; 428/36.92; 525/166
[58] Field of Search ........................... 525/166; 428/35.7, 428/36.92

[56] References Cited

U.S. PATENT DOCUMENTS

| | | | |
|---|---|---|---|
| 3,639,527 | 2/1972 | Brinkmann | 525/176 |
| 3,960,807 | 6/1976 | McTaggart | 428/36.92 |
| 4,572,852 | 2/1986 | Gartland et al. | |
| 5,023,137 | 6/1991 | Smith et al. | |

*Primary Examiner*—Patricia A. Short
*Attorney, Agent, or Firm*—Kim Muller

[57] ABSTRACT

This invention relates to a thermoplastic resin composition which is particularly suitable for use in thermoforming thin-walled articles, such as dual-ovenable trays. Articles which are made utilizing this thermoplastic resin composition have improved low-temperature impact strength. This thermoplastic resin composition is comprised of (a) from about 86 weight percent to about 98 weight percent polyethylene terephthalate having an intrinsic viscosity of at least about 0.7 dl/g; (b) from about 1 weight percent to about 7 weight percent of a polyethylene ionomer; and (c) from about 1 weight percent to about 7 weight percent of a polyolefin with repeat units derived from olefin monomers containing 2 to 6 carbon atoms, wherein the thermoplastic resin composition contains an effective amount of a heat stabilizer. The subject invention also includes thermoforming such thermoplastic resin compositions into thin-walled articles having a crystallinity of from about 10 percent to about 40 percent.

12 Claims, No Drawings

POLYESTER COMPOSITION FOR USE IN THERMOFORMING DUAL-OVENABLE TRAYS

This is a continuation of application Ser. No. 350,292, filed Dec. 6, 1994, now abandoned.

FIELD OF THE INVENTION

This invention relates to thermoplastic resin compositions which may be used in a thermoforming process to make dual-ovenable trays. More particularly, this invention relates to a dual-ovenable tray comprising (1) at least 86 weight percent polyethylene terephthalate, (2) not more than 7 weight percent polyethylene ionomer, and (3) not more than 7 weight percent polyolefin.

BACKGROUND OF THE INVENTION

The widespread popularity of microwave ovens for home use has initiated interest in food trays which can be used in either microwave ovens or convection ovens. Such food trays must be able to withstand oven temperatures which approach 200° C. Such trays are of particular value as containers for frozen prepared foods. It is accordingly necessary for such trays to have both good impact strength at freezer temperatures and dimensional stability at oven temperatures. It is, of course, also important for such trays to be capable of withstanding rapid heating from freezer temperatures of about −30° C. to oven temperatures of about 175° C. or even higher.

Containers which are capable of being heated in either convection ovens or microwave ovens are sometimes described as being dual-ovenable. Polyesters are highly suitable for use in making such dual-ovenable containers. However, it is important for the polyester to be in the crystalline state rather than the amorphous state in order to achieve satisfactory high temperature stability. As a general rule, dual-ovenable containers which are comprised of polyester will be heat treated to attain a crystallinity of at least about 15%. Normally, polyesters will undergo crystallization by heat treatment at elevated temperatures and the crystallites formed will remain substantially stable up to near the melting point of the polyester.

Injection molding and thermoforming are widely known methods for forming thermoplastic polyester articles. In injection molding, the polyester is heated above its melting point and injected under sufficient pressure to force the molten polyester to fill the mold cavity. The molten polyester is cooled in the mold until it is rigid enough to be removed. However, the injection molding method is generally not satisfactory for the production of thin walled articles, such as dual-ovenable trays, due to flow lines and layering which develop during the filling of the mold, which lead to non-uniform properties, surface irregularities, and warping of the finished article. Very high filling pressures are also required in the injection molding of thin walled articles due to high melt viscosities.

Thermoforming is another process which is used commercially in the production of polyester articles. It is a particularly valuable technique for use in producing thin-walled articles, such as dual-ovenable food trays, on a commercial basis. In thermoforming, a preformed polyester sheet is preheated to a temperature sufficient to allow the deformation of the sheet. The sheet is then made to conform to the contours of a mold by such means as vacuum assist, air pressure assist, or matched mold assist. The thermoformed article produced is normally heat-treated in the mold in order to attain a crystallinity of at least about 15%.

The physical properties of polyester polymers can be modified through addition of other polymers to form a polyester blend. For example, U.S. Pat. No. 4,572,852 discloses a thermoplastic polyester article consisting of (1) polyethylene terephthalate, (2) a polyolefin containing from 2 to 6 carbon atoms, and (3) an effective amount of a heat stabilizer, which exhibits improved impact resistance and high temperature dimensional stability. Also, U.S. Pat. No. 5,023,137 discloses a thermoplastic polyester article comprising (1) polyethylene terephthalate, (2) polyethylene ionomer, and optionally (3) an effective amount of a heat stabilizer, which exhibits improved low temperature impact strength.

Dual-ovenable trays which are comprised of polyester blends are widely utilized commercially. Polyethylene terephthalate having an intrinsic viscosity of at least about 0.65 dl/g is widely utilized in such applications. It is important that the polyethylene terephthalate used in dual-ovenable trays to have an intrinsic viscosity of at least about 0.65 dl/g in order for the article to have acceptable impact strength at low temperatures, such as those experienced in a freezer.

It would be desirable to improve the low temperature impact strength of dual-ovenable trays. This is because a certain amount of tray breakage occurs during transporting of frozen prepared foods which are packed utilizing such trays. Such trays have also been known to break upon being dropped after taking them out of home freezers. Thus, it would be highly beneficial to manufacture dual-ovenable trays utilizing a material which provides improved low temperature impact strength.

It is an object of this invention to provide an improved thermoplastic resin composition for thermoforming articles, such as dual-ovenable trays, which exhibit improved low-temperature impact performance. Additional objects and advantages of the subject invention will be evident from the detailed description of the invention below.

SUMMARY OF THE INVENTION

It has been unexpectedly found that a three-component blend of (1) polyethylene terephthalate, (2) a polyethylene ionomer, and (3) a polyolefin containing from 2 to 6 carbon atoms, offers an outstanding combination of properties, including improved low-temperature impact strength. Both the polyethylene ionomer and the polyolefin components preferably contain, in addition, an effective amount of a heat stabilizer. The compositions find utility in thermoforming heat-set, thin-walled articles such as dual-ovenable trays.

The subject invention accordingly relates to a thermoformed, non-oriented, heat-set, thin-walled article, comprising: (a) from about 86 weight percent to about 98 weight percent polyethylene terephthalate having an intrinsic viscosity of at least about 0.7 dl/g as measured in a 60:40 phenol:tetrachloroethane mixed solvent system at 30° C.; (b) from about 1 weight percent to about 7 weight percent of a polyethylene ionomer having a melt flow index as measured using ASTM Method D-1238 of less than about 2 g/10 minutes; (c) from about 1 weight percent to about 7 weight percent of a polyolefin with repeat units derived from olefin monomers containing 2 to 6 carbon atoms, wherein the polyolefin contains an effective amount of a heat stabilizer; and wherein said article has a total crystallinity of from about 10% to about 40%. Preferably, the polyethylene ionomer also contains an effective amount of a heat stabilizer.

The subject invention also relates to a process for making heat-set, thin-walled, partially crystalline articles which comprises thermoforming a substantially amorphous sheet which is comprised of: (a) from about 86 weight percent to about 98 weight percent polyethylene terephthalate having an intrinsic viscosity of at least about 0.7 dl/g as measured in a 60:40 phenol:tetrachloroethane mixed solvent system at 30° C.; (b) from about 1 weight percent to about 7 weight percent of a polyethylene ionomer having a melt flow index as measured using ASTM Method D-1238 of less than about 2 g/10 minutes; (c) from about 1 weight percent to about 7 weight percent of a polyolefin with repeat units derived from olefin monomers containing 2 to 6 carbon atoms, wherein the polyolefin contains an effective amount of a heat stabilizer; and wherein the thermoforming is carried out in a heated mold for a time sufficient to achieve a crystallinity in said article of from about 10% to about 40%. Preferably, the polyethylene ionomer also contains an effective amount of a heat stabilizer.

DETAILED DESCRIPTION OF THE INVENTION

The thermoplastic resin compositions of this invention are comprised of polyethylene terephthalate (PET), a polyethylene ionomer, and a polyolefin. Such compositions will normally contain from about 86 weight percent to about 98 weight percent PET, from about 1 weight percent to about 7 weight percent polyethylene ionomer, and from about 1 weight percent to about 7 weight percent polyolefin. It is generally preferred that the thermoplastic resin compositions of this invention contain from about 87 weight percent to about 97 weight percent PET, from about 1 weight percent to about 6 weight percent polyethylene ionomer, and from about 2 weight percent to about 7 weight percent polyolefin. The most preferred compositions of this invention contain from about 90 weight percent to about 94 weight percent PET, from about 1 weight percent to about 3 weight percent polyethylene ionomer, and from about 5 weight percent to about 7 weight percent polyolefin.

PET is comprised of repeat units which are derived from terephthalic acid or a diester thereof and ethylene glycol. The PET utilized in the thermoplastic resin compositions of this invention can be a modified PET. Such modified PET can contain small amounts of repeat units which are derived from diacids other than terephthalic acid and/or glycols in addition to ethylene glycol. For instance, small amounts of isophthalic acid or a naphthalene dicarboxylic acid can be used in the diacid component utilized in preparing the PET. PET which has been modified with a small amount of a diol containing from 3 to 8 carbon atoms is also representative of a modified PET which can be used. For instance, a small amount of 1,4-butane diol can be utilized in the glycol component used in preparing the modified PET. Normally, no more than about 5 weight percent of the repeat units in such modified PET will be comprised of diacids or diols other than a terephthalic acid and ethylene glycol. It is, of course, contemplated that diesters of such dicarboxylic acids and diols can be used. In most cases, such modified PET will contain less than about 3% diacids other than terephthalic acid and less than 3% diols other than ethylene glycol. It will normally be preferred for such modified polyesters to contain only about 1% dicarboxylic acids other than terephthalic acid and/or less than 1% glycols other than ethylene glycol. In any case PET homopolymer is an excellent choice for utilization in the thermoplastic resin compositions of this invention.

The PET utilized in the thermoplastic resin compositions of this invention will normally have an intrinsic viscosity of at least about 0.7 dl/g. In most cases, the PET will have an intrinsic viscosity which is within the range of about 0.8 dl/g to about 1.4 dl/g. It is generally preferred for the PET to have an intrinsic viscosity of at least 0.9 dl/g with it being more preferred for the PET to have an intrinsic viscosity of about 0.95 dl/g. Intrinsic viscosity is defined as the limit of the fraction (ln v)/C as C, the concentration of the polymer solution, approaches 0, wherein v is the relative viscosity which is measured for several different polymer concentrations in a 60:40 mixed solvent system of phenol:tetrachloroethane at 30° C.

The polyethylene ionomers which can be utilized in the practice of this invention are generally copolymers of ethylene and at least one $\alpha, \beta$-ethylenically unsaturated carboxylic acid wherein from about 5 percent to about 90 percent of the carboxylic acid groups are ionized by neutralization with metal ions. The $\alpha, \beta$-ethylenically unsaturated carboxylic acid can be a monocarboxylic acid, or have more than one carboxylic group attached to it. The carboxylic acid groups are neutralized with at least one cation from the group consisting of metallic cations having a valence of 1 to 3. The polyethylene ionomers used in this invention will have a melt flow index as measured using ASTM Method D-1238 after being dried for 16 hours in a vacuum oven at 63° C. of less than about 2 g/10 minutes. It is preferred for the polyethylene ionomer to have a melt flow index of less than about 1.5 g/10 minutes, with it being most preferred for the polyethylene ionomer to have a melt flow index of less than about 1.2 g/10 minutes.

The $\alpha, \beta$-ethylenically unsaturated carboxylic acids which can be copolymerized with the ethylene monomer preferably have 3 to 8 carbon atoms. Examples of such acids include acrylic acid, methacrylic acid, ethacrylic acid, itaconic acid, maleic acid, fumaric acid and monoesters of other dicarboxylic acids, such as methyl hydrogen maleate, methyl hydrogen fumarate, ethyl hydrogen fumarate, and maleic anhydride, which is considered to behave like an acid and be an acid in the present invention.

The polyethylene ionomer will generally contain from about 2 weight percent to about 40 weight percent $\alpha, \beta$-ethylenically unsaturated carboxylic acids and from about 60 weight percent to about 98 weight percent ethylene. The polyethylene ionomer will more typically contain from about 3 weight percent to about 20 weight percent $\alpha, \beta$-ethylenically unsaturated carboxylic acids and from about 80 weight percent to about 97 weight percent ethylene. A preferred polyethylene ionomer is a copolymer of ethylene and an $\alpha, \beta$-ethylenically unsaturated monocarboxylic acid having 3 to 6 carbon atoms. A most preferred $\alpha, \beta$-ethylenically unsaturated monocarboxylic acid is acrylic acid. Methacrylic acid is another highly preferred $\alpha, \beta$-ethylenically unsaturated monocarboxylic acid.

The polyethylene ionomers used in this invention will normally have an impact strength as measured at 23° C. using ASTM Method D-1822S of at least 1100 KJ/m². It is preferred for the polyethylene ionomer to have an impact strength of at least 1150 KJ/m² with it being most preferred for the polyethylene ionomer to have an impact strength of at least 1200 KJ/m².

U.S. Pat. No. 4,248,990 discloses polyethylene ionomers and a process for making polyethylene ionomers in greater detail. Polyethylene ionomers which can be used in the practice of this invention are commercially available from E.I. duPont de Nemours & Company, Inc. and are sold under the tradename SURLYN®. For example, Surlyn® 1605 is a polyethylene ionomer which contains approximately 10% acrylic acid and approximately 5% sodium acrylate. Surlyn® 9721 is a polyethylene ionomer which contains ethylene and methacrylic acid.

The polyolefin which can be utilized in the practice of this invention is produced from olefin monomers having from 2 to 6 carbon atoms. The resulting polymer contains repeat units derived from the original monomer units. These repeat units differ from the monomers in that they no longer contain a carbon-carbon double bond. Such polymers include low density polyethylene, high density polyethylene, linear low density polyethylene, polypropylene, polyisopropylene, polybutene, polypentene, polymethylpentene. A preferred class of polyolefins is the polyethylenes with the most preferred type being linear low density polyethylene, as represented by products marketed by Dow Chemical under the tradenames DOWLEX 2045 and 2035.

The thermoplastic resin composition of this invention will preferably contain one or more heat stabilizers. The inclusion of one or more heat stabilizers has particular utility when the finished article being made from the resin composition will be subjected to high service temperature conditions for long periods of time. The retention of adequate physical properties, especially impact strength, is very important in applications such as food trays for use in dual-ovenable applications. Heat stabilizers as used herein are compounds which demonstrate antioxidant properties, the most important of which is the capacity of inhibiting oxidation. An effective heat stabilizer in the practice of this invention must be capable of protecting the thermoformed article during exposure to elevated temperatures. It is generally preferred to incorporate a heat stabilizer into the polyethylene ionomer component and/or into the polyolefin component of the blend, prior to combining the three blend components into the thermoplastic resin composition of the invention.

The following compounds are representative examples of useful heat stabilizers which can be incorporated into the thermoplastic resin compositions of this invention: alkylated substituted phenols, bisphenols, thiobisacrylates, aromatic amines, organic phosphites, and polyphosphites. The particular aromatic amines which demonstrate specific heat stabilizing capabilities include: primary polyamines, diarylamines, bisdiarylamines, alkylated diarylamines, ketone-diarylamine condensation products, aldehyde-amine condensation products, and aldehyde imines. Conditions which would be considered severe would be those in which the thermoformed article would be exposed to temperatures near 200° C. for periods exceeding about 30 minutes. Preferred heat stabilizers for addition to the polyolefin component of the thermoplastic resin composition include the polyphenols which contain more than two phenol ring structures. Some representative examples of suitable polyphenols include tetrakis(methylene-3(3,5-di-t-butyl-4-hydroxyphenyl)-proprionate)methane and 1,3,5-trimethyl-2, 4,6-tris(3,5-di-t-butyl-4-hydroxybenzyl)benzene. Preferred heat stabilizers for the polyethylene ionomer component of the thermoplastic resin composition include organic phosphites and polyphosphites. A representative phosphite is 2,2'-ethylidene-bis(4,6-di-t-butylphenyl)fluorophosphite.

Persons skilled in the art will be able to easily ascertain the effective amount of heat stabilizer needed, with this amount generally being within the range of about 0.005 weight percent to about 0.5 weight percent, based upon the total weight of the thermoplastic resin composition. It will normally be preferred for the amount of heat stabilizer utilized to be within the range of 0.01 weight percent to 0.5 weight percent, based upon the total weight of the thermoplastic resin composition. The amount of heat stabilizer used will vary with such factors as the degree of protection required, the severity of heat exposure, solubility limitations of the heat stabilizer chosen in the thermoplastic resin composition, and the overall effectiveness of the heat stabilizer.

One or more pigments or colorants can also be added to the thermoplastic resin composition in order to provide it with a desired color. For instance, titanium dioxide can be included in the thermoplastic resin composition in order to provide it with a brilliant white color. One or more colorants can also be added to the thermoplastic resin composition in order to provide it with any of a multitude of colors. Such colorants will normally not act as nucleating agents. Some representative examples of non-nucleating organic colorants include: phthalocyanine blue, solvent red 135, and disperse yellow 64 (CAS No. 10319-14-9). Many other dyes of the solvent and disperse groups are also useful for coloring the thermoplastic resin compositions of this invention. The amount of colorant or combination of colorants needed to obtain a specific desired color can be easily ascertained by persons skilled in the art.

The thermoplastic resin compositions of this invention can be prepared by simply melt blending the PET with the polyethylene ionomer, the polyolefin, the heat stabilizer(s), and optionally, a colorant. Such melt blending is done at a temperature at which the PET is in the liquid state. PET homopolymer has a melting point of about 260° C. Since such a melt blending procedure must be carried out above the melting point of the PET, it will normally be done at a temperature within the range of about 260° C. to 350° C. Normally, it is preferred for the melt blending procedure to be carried out at a temperature within the range of about 280° C. to 320° C. In such a melt blending procedure, the polyethylene ionomer and polyolefin are simply dispersed throughout the molten PET. Sufficient mixing action will be applied so as to result in the formation of a homogeneous system. In other words, the polyethylene ionomer, polyolefin, and heat stabilizers or colorants added should be uniformly dispersed throughout the PET in order to produce optimal thermoplastic resin compositions. Such a melt blending procedure can commercially be carried out in extruders which provide sufficient shearing forces so as to result in adequate mixing.

In the preparation of films or sheeting for subsequent use in thermoforming processes, it is extremely important that the polyethylene ionomer and polyolefin be uniformly dispersed throughout the PET to form a homogeneous blend in order to achieve optimum results. A preferred method of achieving a homogeneous blend is mechanically blending the PET, polyethylene ionomer, and polyolefin prior to introduction into the extruder. It is also preferred for any heat stabilizers to be blended into the polyethylene ionomer and the polyolefin components before they are mixed with the PET. An alternative method involves the preliminary step of masterbatching the polyethylene ionomer, polyolefin, and one or more heat stabilizers, with or without some portion of PET. Such a masterbatch may be melt extruded, pelletized and dried for subsequent addition to PET.

After the thermoplastic resin compositions of this invention have been prepared, they can be utilized in making a wide variety of useful articles of manufacture. The thermoplastic resin compositions of this invention have particular value for use as thermoforming compositions from which thin-walled articles such as dual-ovenable trays can be made. The articles of manufacture to which this invention relates are thin-walled thermoformed articles. Thin-walled as used herein means articles having wall thicknesses of less than about 1 mm.

Since a partially crystalline finished article is necessary for good dimensional stability at high temperatures, knowledge of the degree of crystallinity or percent of crystallinity is of considerable importance. Density is a convenient method of determining the percent of crystallinity since there is a direct relationship between the two for a given polyester composition. A calibrated gradient column can be used for determining density at a particular temperature. The density value can then be converted into a percent of crystallinity.

The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. The crystallization temperature or crystallization onset can be visually observed as the point at which a substantially amorphous, unoriented sheet of PET changes from a translucent, hazy appearance to a white appearance.

As used throughout this specification and the appended claims, the term glass transition temperature means that temperature or temperature range at which a change in slope appears in the volume versus temperature curve for said polymer, and defining a temperature region below which the polymer exhibits a glassy characteristic and above which the polymer exhibits a rubbery characteristic. The glass transition temperature ($T_g$) of amorphous polyethylene terephthalate is about 70° C.

Another aspect of this invention relates to a process for producing heat set, thin-walled articles from the thermoplastic resin compositions of this invention using conventional thermoforming equipment. The complete technique consists of the following steps:

1) Forming a substantially amorphous sheet from the homogeneously blended thermoplastic resin composition;
2) Preheating the sheet until it softens;
3) Positioning the sheet over the mold;
4) Drawing the preheated sheet onto the heated mold surface;
5) Heatsetting the formed sheet by maintaining sheet contact against the heated mold for a sufficient time period to partially crystallize the sheets; and
6) Stripping the part out of the mold cavity.

The sheeting and film for use in the thermoforming process can be made by any conventional method, the most common method being by extrusion through a flat die. It is important that the sheet or film be quenched immediately after extrusion in order to minimize the extent of crystallization developed after forming. Depending upon the method employed in making the film or sheeting, the intrinsic viscosity of the starting thermoplastic resin composition may be reduced slightly by the casting or extrusion process. The thermoformed articles made should have intrinsic viscosities which are similar to the intrinsic viscosities of the film or sheeting from which they are made.

The term substantially amorphous as used herein means a sheet having a level of crystallinity low enough to enable thermoforming of the sheet to be accomplished with satisfactory mold definition and part formation. In currently available thermoforming processes, the level of crystallinity of the preformed sheet should not exceed about 10 percent.

Preheating the substantially amorphous sheet prior to positioning it over the thermoforming mold is necessary in order to achieve the very short molding times required for a viable commercial process. The sheet must be heated above its glass transition temperature and below the point at which it sags excessively during positioning over the mold cavity. In the thermoforming process, a sheet temperature which is within the range of about 130° C. to about 210° C. and a mold temperature which is within the range of about 140° C. to about 220° C. will normally be utilized. It is often preferred to use a sheet temperature which is within the range of about 120° C. to about 170° C. and a mold temperature which is within the range of about 165° C. to about 195° C.

This invention can be practiced by using any of the known thermoforming methods including vacuum assist, air assist, mechanical plug assist or matched mold. The mold should be preheated to a temperature sufficient to achieve the degree of crystallinity desired. Selection of the optimum mold temperature is dependent upon the type of thermoforming equipment, configuration and wall thickness of the article being molded and other factors know to those skilled in the art.

Heatsetting is a term describing the process of thermally inducing partial crystallization of a polyester article without appreciable orientation being present. In the practice of this invention, heatsetting is achieved by maintaining intimate contact of the film or sheet with the heated mold surface for a sufficient time to achieve a level of crystallinity which gives adequate physical properties to the finished part. It has been found that desirable levels of crystallinity should be about 10 to about 40 percent. For containers to be used in high temperature food application, it has been found that crystallinity levels of at least 15 percent were necessary for adequate dimensional stability during demolding operations. A preferred range of crystallinity is from 15 to 35 percent. This range yields parts with excellent dimensional stability and impact resistance.

The heat set part can be stripped out of the mold cavity by known means for removal. One method, blow back, involves breaking the vacuum established between the mold and the formed sheet by the introduction of compressed air. In commercial thermoforming operation, the part is subsequently trimmed and the scrap ground and recycled.

The following examples are intended to be illustrative of the invention, rather than limiting its scope.

EXAMPLE 1

A PET resin having an IV of 0.95 dl/g was extruder-blended with 3 weight percent polyethylene ionomer and 3 weight percent linear low density polyethylene (Sample 1A). For comparison, the same PET was extruder-blended with 3 weight percent polyethylene ionomer (Sample 1B) and with 3 weight percent linear low density polyethylene (Sample 1C). All weight percents identified are based upon total composition weight. The polyolefin in both Sample 1A and Sample 1C contained an effective amount of a heat stabilizer. The three samples are identified in Table 1 below.

The three samples were blended in a 2.5 inch (6.35 cm) extruder which was operated at a temperature within the range of about 260° C. to about 300° C., utilizing an extruder speed of about 45 rpm and a die temperature of about 275 ° C. The extruder utilized a screw which produced sufficient shearing force to homogeneously blend the samples. Sheeting with a thickness of 0.03 inches (0.076 cm) was prepared utilizing a chill roll temperature of about 55° C. and a take-up speed of about 5.8 ft/min (176.8 cm/min).

The sheeting was subsequently thermoformed into trays using a standard thermoformer fitted with a mold to make trays that were 5 inches×5 inches×1 inch. The thermoforming process was carried out using the operating parameters identified in Table 1 below for each sample. Trays formed from Sample 1A required both less preheat time in the oven and less time in the mold, a significant reduction in tray molding cycle time. Trays formed from Sample 1B spent considerably longer time in the mold due to sticking. Trays formed from Sample 1C formed well and were easily released from the mold.

The sheeting and tray samples were analyzed to determine density, which was converted to crystallinity, and intrinsic viscosity (IV). For the trays, density, crystallinity, and IV were determined on both unaged and aged samples, using sections from the bottom portion of the trays. The aged samples were heated in a convection oven at 400° F. (204° C.) for 1 hour. The values for Samples 1A–1C are shown in Table 1 below. The crystallinity levels for the trays of all three samples are within the range needed to maintain dimensional stability.

Two different methods were used to measure the low temperature impact strength of the trays. Falling-projectile-type impact testing was done on a Custom Scientific Failing Dart Drop Unit using ASTM Method 5379 (modified to allow use of the trays described) with a 42 inch drop at −20° F. (−29° C.), and using ASTM Method D1898 on a Dynatup 8250 instrument, also at −20° F. (−29° C.). The impact test results for Samples 1A–1C are shown in Table 1 below.

The tray made from Sample 1A exhibited a surprising impact strength at −20° F.: more than two times that of comparative Sample 1C, and significantly more than comparative Sample 1B, as measured by the Custom Scientific test method. The tray made from Sample 1A also exhibited an impact strength at −20° F. of more than 1.8 times that of Comparative Sample 1C, and significantly more than Comparative Sample 1B, as measured by the Dynatup method. This is particularly surprising since the impact values for the corresponding sheet were more closely grouped.

TABLE 1

|  | Sample 1A (Illustrative) | Sample 1B (Comparative) | Sample 1C (Comparative) |
|---|---|---|---|
| Composition |  |  |  |
| PET content | 94 wt % | 97 wt % | 97 wt % |
| Ionomer Content | 3 wt % | 3 wt % | — |
| Olefin Content | 3 wt % | — | 3 wt % |
| Thermoforming |  |  |  |
| Top oven | 520° F. | 520° F. | 550° F. |
| Bottom oven | 460° F. | 450° F. | 450° F. |
| Mold | 325° F. | 325° F. | 325° F. |
| Oven dwell | 15 sec | 16 sec | 16 sec |
| Mold dwell | 8 sec | 15 sec | 10 sec |
| Sheet | 295–300° F. | 305° F. | 320° C. |
| Density |  |  |  |
| Sheet | 1.2922 | 1.3149 | 1.3116 |
| Unaged tray | 1.3226 | 1.3476 | 1.3472 |
| Aged tray | 1.3284 | 1.3601 | 1.3567 |
| Crystallinity |  |  |  |
| Sheet | 0% | 0% | 0% |
| Unaged tray | 27% | 29% | 32% |
| Aged tray | 34% | 41% | 41% |
| Intrinsic Viscosity |  |  |  |
| Unaged tray | 0.80 | 0.79 | 0.78 |
| Aged tray | 0.76 | 0.71 | 0.79 |
| Custom Scientific |  |  |  |
| Tray | 415.6 gm | 373.9 gm | 204.2 gm |

TABLE 1-continued

|  | Sample 1A (Illustrative) | Sample 1B (Comparative) | Sample 1C (Comparative) |
|---|---|---|---|
| Dynatup |  |  |  |
| Tray | 204.0 lbs | 128.3 lbs | 112.0 lbs |

EXAMPLE 2

Masterbatches of a polyethylene ionomer, and a linear low density polyethylene containing an effective amount of a heat stabilizer, combined in ratios of 1:1, 1:3, and 3:1, were prepared using a 1.25 inch (3.18 cm) extruder which provided homogeneous blends. The masterbatch blends were dried after extrusion.

A PET resin having an IV of 1.04 dl/g was extruder blended with the three masterbatch samples, and with the linear low density polyethylene alone. Sample 2A contained 3 weight percent polyethylene ionomer and 3 weight percent linear low density polyethylene. Sample 2B contained 6 wt % polyethylene ionomer and 2 weight percent linear low density polyethylene. Sample 2C contained 2 weight percent polyethylene ionomer and 6 weight percent linear low density polyethylene, and Sample 2D (comparative) contained 3 weight percent linear low density polyethylene.

Sheeting with a thickness of 0.023 inches (0.058 cm) was prepared as described in Example 1, and the sheeting was used to make standard 5 inch×5 inch×1 inch trays, as described in Example 1. In addition, the sheeting was used to make 4-compartment oval frozen dinner trays that were 7 inches×9 inches×1 3/16 inch.

The standard trays were analyzed to determine density and crystallinity, as described in Example 1. The two methods for measuring impact strength, the Custom Scientific and Dynatup methods described in Example 1, were utilized to determine impact strength at −40° F. (−40° C.). Results from these tests are shown in Table 2 below.

An additional "edge drop" impact test was performed on the frozen dinner trays. The trays were filled with 325 grams of water, frozen, placed in a paperboard box, and dropped from a height of 24 inches. Additional tests were performed with Samples 2B–2D at heights of 12, 16, 20, 24, 28, 32, 36, and 40 inches. Ten duplicates of each sample were used for each drop height, such that a percent breakage could be determined. Results of these tests are shown in Table 2 below.

The results of the impact tests, particularly the edge drop tests, indicate that the thermoplastic resin compositions of the invention exhibit surprisingly superior low temperature impact strength.

While certain representative embodiments and details have been shown for the purpose of illustrating this invention, it will be apparent to those persons skilled in this art that various changes and modifications can be made therein without departing from the scope of this invention.

TABLE 2

|  | Sample 2A (Illustrative) | Sample 2B (Illustrative) | Sample 2C (Illustrative) | Sample 2D (Comparative) |
| --- | --- | --- | --- | --- |
| Composition |  |  |  |  |
| PET content | 94% | 92 wt % | 92 wt % | 97 wt % |
| Ionomer Content | 3 wt % | 6 wt % | 2 wt % | — |
| Olefin Content | 3 wt % | 2 wt % | 6 wt % | 3 wt % |
| Density |  |  |  |  |
| Sheet | 1.2927 | 1.2987 | 1.2985 | 1.3156 |
| Unaged tray | 1.3175 | 1.3201 | 1.3151 | 1.3470 |
| Aged tray | — | — | — | — |
| Crystallinity |  |  |  |  |
| Sheet | 0% | 0% | 0% | 0% |
| Unaged tray | 27% | 28% | 27% | 30% |
| Aged tray | — | — | — | — |
| Custom Scientific |  |  |  |  |
| Tray Dynatup | 72 gms | 124 gms | 100 gms | 37 gms |
| Tray Edge Drop (breakage) | 149 lbs | 170 lbs | 154 lbs | 115 lbs |
| 12 inches |  | 10% | 0% | 15% |
| 16 inches |  | 20% | 20% | 25% |
| 20 inches |  | 25% | 5% | 65% |
| 24 inches | 20% | 15% | 30% | 95% |
| 24 inches |  | 40% | 25% | 90% |
| 28 inches |  | 60% | 15% | 90% |
| 32 inches |  | 55% | 40% | 100% |
| 36 inches |  | 70% | 40% | — |
| 40 inches |  | 70% | 60% | — |

What is claimed is:

1. A thermoformed, non-oriented, heat-set, thin-walled article, the composition consisting essentially of:

(a) from about 90 weight percent to about 94 weight percent polyethylene terephthalate having an intrinsic viscosity of at least 0.7 dl/g, as measured in a 60:40 phenol :tetrachloroethane mixed solvent system at 30° C.;

(b) from about 1 weight percent to about 3 weight percent of a polyethylene ionomer having a melt flow index as measured using ASTM Method D-1238 of less than 2 grams/10 minute;

(c) from about 5 weight percent to about 7 weight percent of a polyolefin with repeat units derived from olefin monomers containing 2 to 6 carbon atoms; and (d) an effective amount of a heat stabilizer;

said article having a total crystallinity of from about 10 percent to about 40 percent.

2. An article as described in claim 1 wherein the polyethylene terephthalate has an intrinsic viscosity of at least 0.9 dl/g.

3. An article as described in claim 2 wherein the polyethylene ionomer is a terpolymer of ethylene, acrylic acid, and sodium acrylate.

4. An article as described in claim 3 wherein the polyolefin is polyethylene.

5. An article as described in claim 4 wherein the article is a food container.

6. An article as described in claim 2 wherein the polyethylene ionomer is a polymer which contains from about 3 weight percent to about 20 weight percent α, β-ethylenically unsaturated carboxylic acids and from about 80 weight percent to about 97 weight percent ethylene, based on total weight of polyethylene ionomer.

7. An article as described in claim 6 wherein the polyolefin is a linear low density polyethylene.

8. An article as described in claim 7 wherein the polyethylene ionomer has a melt flow index of less than 1.5 grams/10 minutes.

9. An article as described in claim 8 which has a crystallinity of from about 15 percent to about 35 percent.

10. An article as described in claim 9 wherein the article is a dual-ovenable tray.

11. An article as described in claim 1 wherein the polyethylene ionomer is a copolymer of ethylene and methacrylate acid which is from about 5 percent to about 90 percent neutralized with at least one metallic cation having a valence of 1 to 3.

12. A process for making a heat-set, partially crystalline, thin-walled article which comprises thermoforming a substantially amorphous sheet which is comprised of:

(a) from about 90 weight percent to about 94 weight percent polyethylene terephthalate having an intrinsic viscosity of at least 0.7 dl/g, as measured in a 60:40 phenol:tetrachloroethane mixed solvent system at 30° C.;

(b) from about 1 weight percent to about 3 weight percent of a polyethylene ionomer having a valence of 1 to 3 and having a melt flow index as measured using ASTM Method D-1238 of less than 2 grams/10 minute;

(c) from about 5 weight percent to about 7 weight percent of a polyolefin with repeat units derived from olefin monomers containing 2 to 6 carbon atoms; and (d) an effective amount of a heat stabilizer;

said sheet having a total crystallinity of from 10 percent to about 40 percent.

* * * * *